(12) United States Patent
Kikuchi et al.

(10) Patent No.: US 11,077,485 B2
(45) Date of Patent: Aug. 3, 2021

(54) ROTARY FORGE DEVICE TESTING DEVICE, TESTING TOOL, TESTING METHOD, BEARING UNIT MANUFACTURING DEVICE, BEARING UNIT MANUFACTURING METHOD, AND VEHICLE MANUFACTURING METHOD

(71) Applicant: NSK LTD., Tokyo (JP)

(72) Inventors: Tokumasa Kikuchi, Fujisawa (JP); Nobuyuki Hagiwara, Fujisawa (JP); Tetsurou Maruno, Fujisawa (JP)

(73) Assignee: NSK LTD., Tokyo (JP)

( * ) Notice: Subject to any disclaimer, the term of this patent is extended or adjusted under 35 U.S.C. 154(b) by 204 days.

(21) Appl. No.: 16/385,489

(22) Filed: Apr. 16, 2019

(65) Prior Publication Data

US 2019/0240722 A1   Aug. 8, 2019

Related U.S. Application Data

(62) Division of application No. 15/760,708, filed as application No. PCT/JP2017/025278 on Jul. 11, 2017, now Pat. No. 10,399,141.

(30) Foreign Application Priority Data

Jul. 12, 2016   (JP) ................. 2016-137710

(51) Int. Cl.
 *B21J 9/06* (2006.01)
 *G01B 11/26* (2006.01)
 (Continued)

(52) U.S. Cl.
 CPC ............... *B21J 9/06* (2013.01); *B21J 9/025* (2013.01); *B21J 9/20* (2013.01); *B60B 27/0005* (2013.01);
 (Continued)

(58) Field of Classification Search
 CPC ...... B21J 9/06; B21J 9/20; B21J 9/025; B60B 27/0005; B60B 27/0084; G01B 11/26
 See application file for complete search history.

(56) References Cited

U.S. PATENT DOCUMENTS 4,566,202 A   1/1986   Hamar
4,651,548 A   3/1987   Bernet
(Continued)

FOREIGN PATENT DOCUMENTS

JP   6-142719 A    5/1994
JP   11-129703 A   5/1999
(Continued)

OTHER PUBLICATIONS

Communication dated Jan. 9, 2018, from the Japanese Patent Office in counterpart application No. 2017-559727.
(Continued)

*Primary Examiner* — Moshe Wilensky
(74) *Attorney, Agent, or Firm* — Sughrue Mion, PLLC

(57) ABSTRACT

The inspection device of the swing forging apparatus includes an inspection tool and a laser irradiation surface. When inspecting the swing forging apparatus, the inspection tool is supported to the head to which the processing roll is not supported, with a substantially same condition as the processing roll, and the inspection tool has a function of emitting a laser beam onto a central axis of the inspection tool. When inspecting the swing forging apparatus, the laser irradiation surface is arranged so that a relative position of the laser irradiation surface to the head in an axial direction of the head can be changed and the laser beam can be irradiated to the laser irradiation surface.

7 Claims, 7 Drawing Sheets

(51) Int. Cl.
   *B21J 9/02* (2006.01)
   *B21J 9/20* (2006.01)
   *G01B 11/27* (2006.01)
   *B60B 27/00* (2006.01)

(52) U.S. Cl.
   CPC .......... *B60B 27/0084* (2013.01); *G01B 11/26* (2013.01); *G01B 11/272* (2013.01)

(56) References Cited

U.S. PATENT DOCUMENTS

| | | | |
|---|---|---|---|
| 6,280,096 | B1 | 8/2001 | Miyazaki et al. |
| 6,422,758 | B1 | 7/2002 | Miyazaki et al. |
| 2001/0046339 | A1 | 11/2001 | Miyazaki et al. |
| 2002/0146185 | A1 | 10/2002 | Miyazaki et al. |
| 2003/0103705 | A1 | 6/2003 | Miyazaki et al. |
| 2016/0263940 | A1 | 9/2016 | Hagiwara |

FOREIGN PATENT DOCUMENTS

| | | |
|---|---|---|
| JP | 11-188419 A | 7/1999 |
| JP | 2013-154371 A | 8/2013 |
| JP | 2013-215738 A | 10/2013 |
| JP | 2015-77616 A | 4/2015 |

OTHER PUBLICATIONS

International Search Report, issued by International Searching Authority in corresponding International Application No. PCT/JP2017/025278, dated Oct. 10, 2017, (PCT/ISA/210).

Written Opinion, issued by International Searching Authority in corresponding International Application No. PCT/JP2017/025278, dated Oct. 10, 2017, (PCT/ISA/237).

European Search Report dated Apr. 5, 2019 issued by the European Patent Office in counterpart European Application No. 1782-7627.5.

ROTARY FORGE DEVICE TESTING DEVICE, TESTING TOOL, TESTING METHOD, BEARING UNIT MANUFACTURING DEVICE, BEARING UNIT MANUFACTURING METHOD, AND VEHICLE MANUFACTURING METHOD

CROSS-REFERENCE TO RELATED APPLICATIONS

This is a divisional of U.S. patent application Ser. No. 15/760,708 filed on Mar. 16, 2018, which is a National Stage Entry of PCT/JP2017/025278 filed on Jul. 11, 2017 and based upon JP 2016-137710 filed on Jul. 12, 2016, the entire disclosures of the prior applications are hereby incorporated by reference.

TECHNICAL FIELD

The present invention relates to an inspection device of a swing forging apparatus, an inspection tool of the swing forging apparatus, an inspection method of the swing forging apparatus, a manufacturing apparatus of a bearing unit, and a manufacturing method of a bearing unit.

RELATED ART

FIG. 8 depicts an example of a rolling bearing unit for wheel support of a vehicle. The rolling bearing unit for wheel support includes an outer ring 1, a hub 2, and a plurality of rolling elements 5, 5. The outer ring 1 is fitted and fixed to a suspension, so that it is not rotated even during the using. The hub 2 is configured to rotate together with a wheel with supporting and fixing the wheel thereto. The plurality of rolling elements 5, 5 is provided between double rows of outer races 3a, 3b provided on an inner peripheral surface of the outer ring 1 and double rows of inner races 4a, 4b provided on an outer peripheral surface of the hub 2.

The hub 2 is configured by coupling and fixing a hub main body 6 having the axially outboard (a left side in FIG. 8) inner race 4a directly formed on an outer peripheral surface thereof and an inner ring 7 having the axially inboard (a right side in FIG. 8) inner race 4b directly formed on an outer peripheral surface thereof. The inner ring 7 is externally fitted to a part close to an axially inboard end portion of the hub main body 6. An axially inboard end face of the inner ring 7 is pressed by a swaging part 9 formed by plastically deforming a cylindrical part 8, which is provided at the axially inboard end portion of the hub main body 6, in a radially outward direction.

The swaging part 9 can be formed by a variety of known swing forging apparatuses disclosed in Patent Document 1 and the like. The swing forging apparatus includes a head and a processing roll. The head is configured to rotatively drive about a central axis thereof. Also, the processing roll is supported to the head so that it can be rotated about a central axis thereof at a state where the central axis is inclined relative to the central axis of the head.

When forming the swaging part 9 at the axially inboard end portion of the hub main body 6, which is a workpiece (an object to be processed), the processing roll is pressed to a circumferential portion of an axially inboard end portion of the cylindrical part 8 at a state where the central axis of the hub main body 6 is made to coincide with the central axis of the head. At this state, the head is rotatively driven about the central axis of the head, so that the processing roll is rotated (revolved) about the central axis of the head and is also rotated on the central axis of the processing roll. As a result, the processing of plastically deforming the cylindrical part 8 in the radially outward direction progresses partially and continuously in a circumferential direction, so that the swaging part 9 is formed.

In the swing forging apparatus as described above, manufacturing errors of the head and the mechanism part configured to drive the head become major causes, so that a position of a swing center and an inclination angle of the processing roll after completion may not be made as designed. Even in this case, if it is possible to know the position of the swing center and the inclination angle of the processing roll after completion, it is easy to perform management for appropriately forming the swaging part 9. However, in the related art, it is difficult to know the position of the swing center and the inclination angle of the processing roll after completion. For this reason, as alternative solutions, a test of forming the swaging part 9 is performed using the swing forging apparatus after completion, so that when it is not possible to appropriately form the swaging part 9, an operation of changing a processing condition or replacing a component of the swing forging apparatus. Then, the test and the operation are repeated to perform the management for appropriately forming the swaging part 9. However, according to this method, the rolling bearing unit for wheel support that is provided for the test is discarded.

The above situations occur not only in the swing forging apparatus for forming the swaging part 9 of the hub main body 6 but also in a swing forging apparatus (for example, refer to Patent Documents 2 and 3) for processing a variety of workpieces of the related art.

CITATION LIST

Patent Document

Patent Document 1: JP-A-H11-129703
Patent Document 2: JP-A-2013-215738
Patent Document 3: JP-A-2013-154371

SUMMARY OF THE INVENTION

Problems to be Solved

The present invention has been made in view of the above situations, and an object thereof is to implement an apparatus (a tool) and a method for precisely estimating a position of a swing center and an inclination angle of a processing roll configuring a swing forging apparatus after completion.

Means for Solving Problems

A swing forging apparatus of the present invention includes a head and a processing roll.

The head is configured to rotatively drive about a central axis thereof.

Also, the processing roll is supported to the head so that it can be rotated about a central axis of the processing roll at a state where the central axis is inclined relative to the central axis of the head.

When using the swing forging apparatus, the head is rotatively driven about the central axis of the head with the processing roll being pressed to a workpiece, so that the processing roll is rotated about the central axis of the head and is also rotated about the central axis of the processing roll.

An inspection device of a swing forging apparatus includes an inspection tool and a laser irradiation surface.

When inspecting the swing forging apparatus, the inspection tool is supported to the head to which the processing roll is not supported, with the substantially same condition as the processing roll, and has a function of emitting a laser beam onto a central axis of the inspection tool.

Also, the laser irradiation surface is arranged so that a relative position thereof to the head in an axial direction of the head can be changed and the laser beam can be irradiated thereto when inspecting the swing forging apparatus.

In a second aspect, a sensor arranged to detect an irradiation position of the laser beam to the laser irradiation surface when inspecting the swing forging apparatus may be provided.

When implementing the second aspect, for example, as a third aspect, a calculator may be provided. The calculator has functions of, when inspecting the swing forging apparatus, at a state where the head is rotatively driven about a central axis thereof and a laser beam emitted from the inspection tool onto a central axis of the inspection tool is irradiated to the laser irradiation surface while applying a predetermined load (for example, a load to be applied to the processing roll when processing a workpiece by the processing roll) to the inspection tool or not applying the load, changing a radius of a locus of an irradiation position of the laser beam to the laser irradiation surface by changing a relative position between the head and the laser irradiation surface in the axial direction of the head, and obtaining a position of the locus (a point when a minimum radius becomes zero (0); a swing center of the inspection tool) having a minimum radius at a coordinate system set for the swing forging apparatus on the basis of a detection signal of the sensor when the radius becomes smallest (including zero (0)).

When implementing the third aspect, for example, as a fourth aspect, the position of the locus having the minimum radius may be estimated as a position of a swing center of the processing roll at a state where the processing roll is supported to the head.

Also, when implementing the second to fourth aspects, for example, as a fifth aspect, a calculator may be provided. The calculator has functions of, upon inspection of the swing forging apparatus, at a state where the head is rotatively driven about a central axis thereof and a laser beam emitted from the inspection tool onto a central axis of the inspection tool is irradiated to the laser irradiation surface while applying a predetermined load (for example, a load to be applied to the processing roll when processing a workpiece by the processing roll) to the inspection tool or not applying the load, when a locus of an irradiation position of the laser beam to the laser irradiation surface is changed by changing a relative position between the head and the laser irradiation surface in the axial direction of the head, obtaining a variation $\Delta R$ in the radius of the locus of the irradiation position on the basis of a detection signal of the sensor when the relative position is changed by a variation $\Delta L$, and obtaining an inclination angle of the central axis of the inspection tool relative to the central axis of the head by using the respective variations $\Delta L$, $\Delta R$.

When implementing the fifth aspect, for example, as a sixth aspect, the inclination angle of the central axis of the inspection tool relative to the central axis of the head may be estimated as an inclination angle of the central axis of the processing roll relative to the central axis of the head at a state where the processing roll is supported to the head.

In the meantime, the calculators of the third to sixth aspects may be independent of each other or may be singular.

As a seventh aspect, an inspection tool of a swing forging apparatus includes a head configured to rotatively drive about a central axis thereof, and a processing roll supported to the head so that it can be rotated about a central axis of the processing roll at a state where the central axis is inclined relative to the central axis of the head, wherein when inspecting the swing forging apparatus, the inspection tool is supported to the head to which the processing roll is not supported, with the substantially same condition as the processing roll, and has a function of emitting a laser beam onto a central axis of the inspection tool.

In an eighth aspect, an inspection method of a swing forging apparatus is provided. The method includes, when inspecting the swing forging apparatus by using the inspection device of the swing forging apparatus of the first to fourth aspects, at a state where the head is rotatively driven about a central axis thereof and a laser beam emitted from the inspection tool onto a central axis of the inspection tool is irradiated to the laser irradiation surface while applying a predetermined load (for example, a load to be applied to the processing roll when processing a workpiece by the processing roll) to the inspection tool or not applying the load, changing a radius of a locus of an irradiation position of the laser beam to the laser irradiation surface to minimize (including zero (0)) the locus by changing a relative position between the head and the laser irradiation surface in the axial direction of the head, and obtaining a position of the locus (a point when a minimum radius becomes zero (0); a swing center of the inspection tool) having the minimum radius at a coordinate system set for the swing forging apparatus.

In the meantime, when implementing the inspection method, the locus of the irradiation position may be detected with operator's naked eyes or may be detected by the sensor. Also, the process of obtaining the position of the locus having the minimum radius may be performed by an operator or by the calculator.

In a ninth aspect, an inspection method of a swing forging apparatus is provided. The method includes, upon inspection of the swing forging apparatus by using the inspection device of the swing forging apparatus of the first to sixth aspects, at a state where the head is rotatively driven about a central axis thereof and a laser beam emitted from the inspection tool onto a central axis of the inspection tool is irradiated to the laser irradiation surface while applying a predetermined load (for example, a load to be applied to the processing roll when processing a workpiece by the processing roll) to the inspection tool or not applying the load, when a locus of an irradiation position of the laser beam to the laser irradiation surface is changed by changing a relative position between the head and the laser irradiation surface in the axial direction of the head, so that the relative position is changed by a variation $\Delta L$, obtaining a variation $\Delta R$ in a radius of the locus of the irradiation position, and obtaining an inclination angle of the central axis of the inspection tool relative to the central axis of the head by using the respective variations $\Delta L$, $\Delta R$.

In the meantime, when implementing the inspection method, the locus of the irradiation position may be detected with operator's naked eyes or may be detected by the sensor. Also, the processes of obtaining the respective variations $\Delta L$, $\Delta R$ and the inclination angle may be performed by an operator or by the calculator.

Effects of the Invention

According to the inspection device of the swing forging apparatus, the inspection tool, and the inspection method of the present invention, it is possible to precisely estimate the position (the position at the coordinate system set for the swing forging apparatus) of the swing center of the processing roll configuring the swing forging apparatus after completion and the inclination angle of the processing roll.

That is, according to the present invention, it is possible to obtain the position of the swing center of the inspection tool and the inclination angle of the central axis of the inspection tool by using the locus of the irradiation position of the laser beam to the laser irradiation surface. In the meantime, the inspection tool is supported to the head to which the processing roll is not supported, with the substantially same condition as the processing roll. For this reason, it is possible to precisely estimate the position of the swing center and the inclination angle of the central axis of the inspection tool obtained as described above, as the position of the swing center and the inclination angle of the central axis of the processing roll configuring the swing forging apparatus after completion.

Also, when the position of the swing center and the inclination angle of the central axis of the inspection tool are obtained while applying the predetermined load (for example, a load Fα to be applied to the processing roll when processing the workpiece by the processing roll) to the inspection tool, the position of the swing center and the inclination angle of the central axis of the inspection tool obtained in this way can be precisely estimated as the position of the swing center and the inclination angle of the central axis of the processing roll at the state where the predetermined load is applied (for example, during shape forming of the workpiece when the predetermined load is the load Fα).

DETAILED DESCRIPTION OF EMBODIMENTS

Example of Embodiment

An example of an embodiment of the present invention will be described with reference to FIGS. 1 to 7B.

First, a swing forging apparatus, which is an inspection target of the example, is described with reference to FIGS. 1 to 3.

Figure 8:
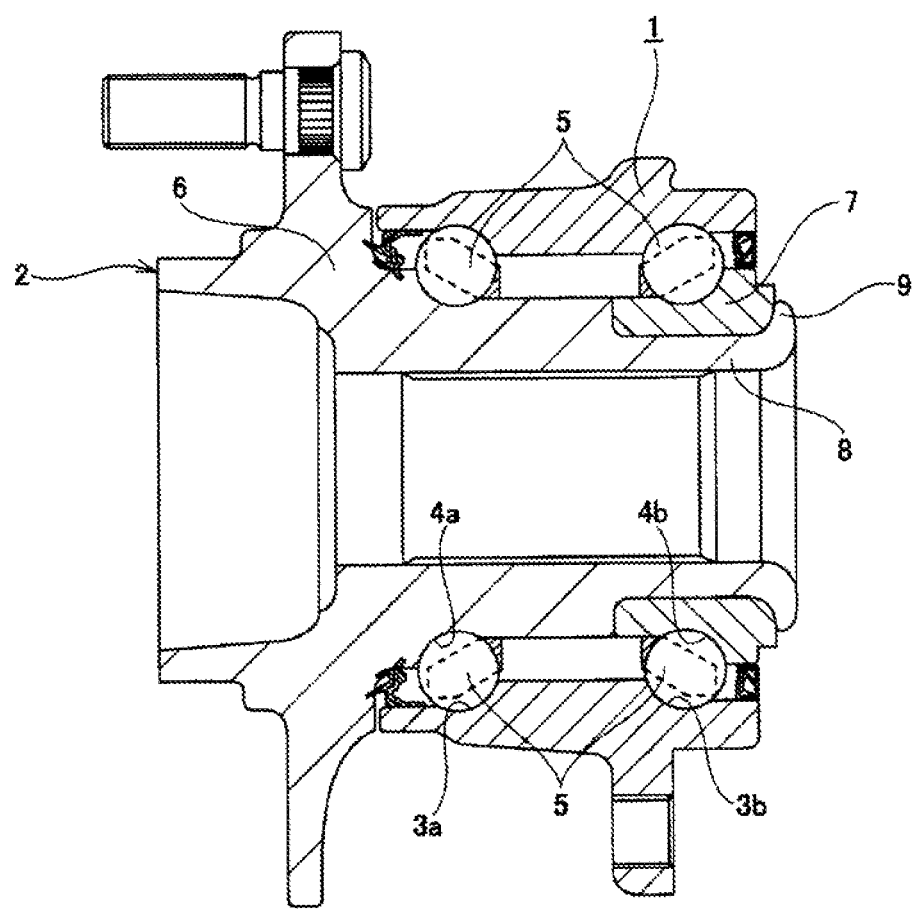
FIG. 8 is a sectional view depicting an example of a rolling bearing unit for wheel support having a swaging part formed by a swing forging apparatus.

The swing forging apparatus can form the swaging part 9 of the rolling bearing unit for wheel support shown in FIG. 8. The swing forging apparatus includes a base 10, a support column 11, a holder 12, a head 13, a head driving means 14, and a processing roll 15.

The holder 12 is fixed to an upper surface of the base 10. The holder 12 can hold and fix the hub main body 6 configuring the rolling bearing unit for wheel support. The axially inboard end portion of the hub main body 6 held and fixed to holder 12 faces upward. Also, at a state where the hub main body 6 is held and fixed to the holder 12, both the central axes of the hub main body 6 is held and fixed to the holder 12 coincide with each other in an upper and lower direction.

The head 13 is arranged above the holder 12. The head 13 is supported by the support column 11 fixed to the base 10, via the head driving means 14. At a state where the head 13 is supported to the support column 11, a central axis α of the head 13 coincides with the central axis of the holder 12 (the central axis of the hub main body 6). The head 13 is provided on its lower surface with a holding concave hole 16 having s central axis inclined relative to the central axis α of the head 13.

The head driving means 14 includes a spindle device 17 and a cylinder 18.

The spindle device 17 is arranged in the upper and lower direction. The spindle device 17 can rotatively drive a spindle shaft (not shown) arranged at a radially central portion in a direct manner (without via a deceleration mechanism) by an electric motor 19 arranged at an upper end portion of the spindle device.

The cylinder 18 is a hydraulic cylinder and can displace the spindle device 17 relative to the support column 11 in the upper and lower direction.

The head 13 is coupled and fixed to a lower end portion of the spindle shaft of the spindle device 17. At this state, the head 13 can be rotatively driven about the central axis α by the spindle device 17 and can also be displaced in the upper and lower direction (an axial direction of the head) by the cylinder 18.

The processing roll 15 includes a shaft part 20, a head part 21, and a pressing surface 22. The head part 21 is provided at a lower end portion of the shaft part 20 and has a diameter larger than the shaft part 20. The pressing surface 22 is provided over an entire circumference of a lower surface of the head part 21 and has a circular ring shape.

The shaft part 20 of the processing roll 15 is inserted in the holding concave hole 16 of the head 13. At this state, an upper end portion of the shaft part 20 is rotatably supported by a thrust rolling bearing 23, and an axially intermediate portion of the shaft part 20 is rotatably supported by a radial rolling bearing 24. That is, at a state where the head part 21 protrudes from a lower surface of the head 13 and a central axis β of the processing roll is inclined relative to the central axis α of the head 13 by an inclination angle θ, the processing roll 15 is supported to the head 13 to be rotatable about the central axis β.

A method of forming the swaging part 9 at the axially inboard end portion of the hub main body 6, which is a workpiece, by the swing forging apparatus configured as described above is described.

Figure 2:
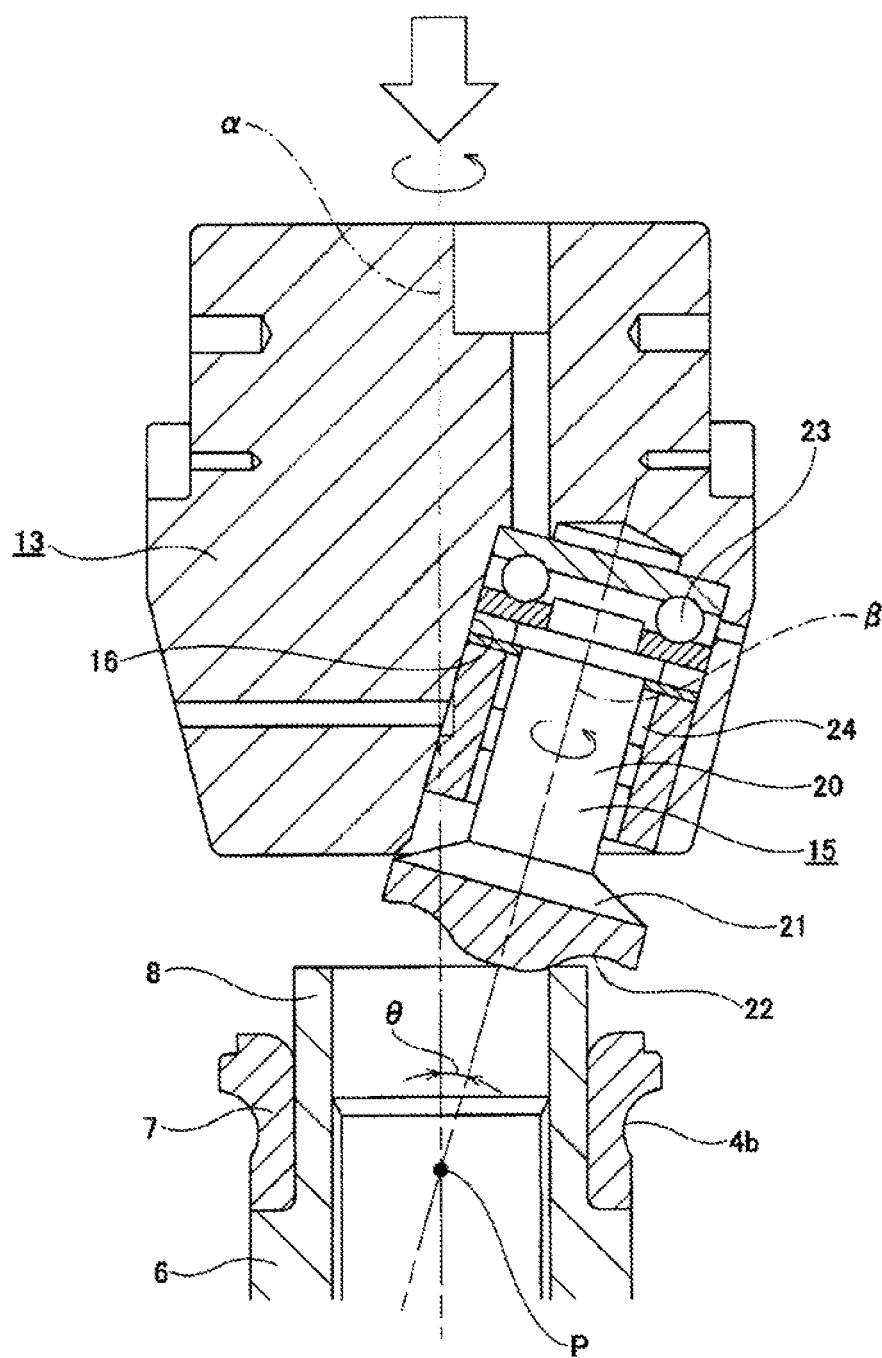
FIG. 2 is a partial sectional view depicting a start state of processing for forming a swaging part of a rolling bearing unit for wheel support by the swing forging apparatus, which is an inspection target, in accordance with the example of the embodiment.

At a state where the hub main body 6 before the swaging part 9 is formed and the other components configuring the rolling bearing unit for wheel support are assembled, the hub main body 6 is held and fixed by the holder 12, so that the central axis of the hub main body 6 is made to coincide with the central axis α of the head 13, as shown in FIG. 2. Meanwhile, in FIGS. 2 and 3, only the axially inboard end portion of the hub main body 6 and the inner ring 7 of the rolling bearing unit for wheel support are shown, and the other parts are not shown.

At this state, as shown in FIG. 2, a circumferential portion of the pressing surface 22 of the processing roll 15 is pressed to a circumferential portion of the axially inboard end portion of the cylindrical part 8 provided at the axially inboard end portion of the hub main body 6. At this time, the pressing force is generated by the cylinder 18.

At this state, when the head 13 is rotatively driven about the central axis α, the processing roll 15 is rotated (revolved) about the central axis α of the head 13 and is also rotated on the central axis β of the processing roll. As a result, the processing of plastically deforming the cylindrical part 8 in the radially outward direction progresses partially and continuously in the circumferential direction, so that the swaging part 9 is formed, as shown in FIG. 3.

Subsequently, an inspection device of the swing forging apparatus of the example is described with reference to FIGS. 4 to 7B.

The inspection device of the swing forging apparatus of the example is configured to obtain (to precisely estimate) a position of a swing center P of the processing roll 15 and an inclination angle θ of the central axis β of the processing roll 15 relative to the central axis α of the head 13, for the swing forging apparatus after completion.

The swing center P is an intersection point of the central axis α of the head 13 and the central axis β of the processing roll 15. Also, the position of the swing center P is a position at a coordinate system set for the swing forging apparatus, and in this example, changes as the cylinder 18 is driven by a command from a controller (a control unit) of the swing forging apparatus. Also, the position of the swing center P is a position of a height Z from a reference surface 34, which is an upper surface of the base 10.

The inspection device of the swing forging apparatus of the example includes an inspection tool 25, a receiving stand 26, a laser irradiation surface 27, a sensor (not shown), and a computer (not shown) having a calculator.

When inspecting the swing forging apparatus, the inspection tool 25 is supported to the head 13 at a state where the processing roll 15 is not supported thereto, with the substantially same condition as the processing roll 15. The inspection tool 25 can emit a laser beam $B_L$ onto a central axis thereof (onto a central axis $β_A$). The inspection tool 25 includes an inspection roll part 29 and a laser generator 30.

The inspection roll part 29 has substantially the same stiffness as the processing roll 15. The inspection roll part 29 has a shaft part 20a, a head part 21a, and a pressing surface 22a. The head part 21a is provided at a lower end portion of the shaft part 20a and has a diameter larger than the shaft part 20a. The pressing surface 22a is provided over an entire circumference of a lower surface of the head part 21a and has a circular ring shape.

Meanwhile, in this example, a shape of the pressing surface 22a is different from the pressing surface 22 of the processing roll 15 (i.e., the shape is simply a conical surface). However, when implementing the present invention, the shape of the pressing surface 22a may be made to be the same as the shape of the pressing surface 22.

The inspection roll part 29 is supported to the head 13 at a state where the processing roll 15 is not supported thereto, with the substantially same condition as the processing roll 15. That is, at a state where the shaft part 20a is inserted in the holding concave hole 16 of the head 13, an upper end portion of the shaft part 20a of the inspection roll part 29 is rotatably supported by a thrust rolling bearing 23a, and an axially intermediate portion of the shaft part 20a is rotatably supported by a radial rolling bearing 24a.

The thrust rolling bearing 23a and the radial rolling bearing 24a have the same specifications as the thrust rolling bearing 23 and the radial rolling bearing 24 for supporting the processing roll 15. Therefore, the respective bearings 23, 24 may be used as they are, or bearings provided separately from the respective bearings 23, 24 may be used.

The laser generator 30 is mounted to a radially central portion of the inspection roll part 29. A tip end portion of the laser generator 30 protrudes from a central portion of a lower surface of the head part 21a configuring the inspection roll part 29. The laser beam $B_L$ can be emitted from the tip end portion of the laser generator 30 onto the central axis of the inspection tool 25. Meanwhile, in this example, the laser generator 30 has a battery for power supply.

The receiving stand 26 is held and fixed by the holder 12 (not shown in FIG. 4; refer to FIG. 1) with being arranged below the head 13 when inspecting the swing forging apparatus. The receiving stand 26 is formed to have a bottomed cylindrical shape by a metal material such as a steel material. The receiving stand 26 has a cylindrical part 31 and a bottom plate part 32.

A central axis of the cylindrical part 31 coincides with the central axis α of the head 13. The bottom plate part 32 blocks a lower end opening of the cylindrical part 31. The pressing surface 22a of the inspection tool 25 can be pressed to an upper end portion of the cylindrical part 31, irrespective of a rotational position of the head 13. That is, when the head 13 is rotated about the central axis α thereof with the pressing surface 22a of the inspection tool 25 being pressed to the upper end portion of the cylindrical part 31, the inspection tool 25 can be rotated (revolved) about the central axis α of the head 13 and can also be rotated on the central axis $β_A$ thereof.

The laser irradiation surface 27 is arranged below the head 13 and the laser beam $B_L$ is irradiated thereto when inspecting the swing forging apparatus. In this example, the laser irradiation surface 27 is provided on an upper surface of an elevating table 33 provided in the receiving stand 26. The laser irradiation surface 27 is a planar surface perpendicular to the central axis α of the head 13.

The elevating table 33 can be lifted up and down by an electrically operated elevator device (not shown) provided in the receiving stand 26. That is, when the elevating table 33 is lifted up and down, a relative position between the laser irradiation surface 27 and the head 13 (the inspection tool 25) can be changed in an axial direction of the head 13. In other words, the laser irradiation surface 27 can change the height Z from the reference surface 34.

When inspecting the swing forging apparatus, the sensor is provided in the receiving stand 26, and can detect an irradiation position of the laser beam $B_L$ to the laser irradiation surface 27.

In this example, the sensor is a planar image sensor such as a CCD, a CMOS or the like, and can acquire an irradiation position of the laser beam $B_L$ to the laser irradiation surface 27 by an X-Y coordinate on the laser irradiation surface 27.

The computer has a function of obtaining a position of a swing center $P_A$ of the inspection tool 25 and an inclination angle $\theta_A$ of a central axis $\beta_A$ of the inspection roll part 29 relative to the central axis α of the head 13 by using the detection signal of the sensor (a signal indicative of the irradiation position of the laser beam $B_L$ to the laser irradiation surface 27). This function will be specifically described later.

In the meantime, the swing center $P_A$ is an intersection point of the central axis α of the head 13 and the central axis $\beta_A$ of the inspection tool 25. Also, the position of the swing center $P_A$ is a position at the coordinate system set to the swing forging apparatus, and in this example, is position of the height Z from the reference surface 34.

A method of inspecting the swing forging apparatus with the inspection device configured as described above is described.

Figure 4:
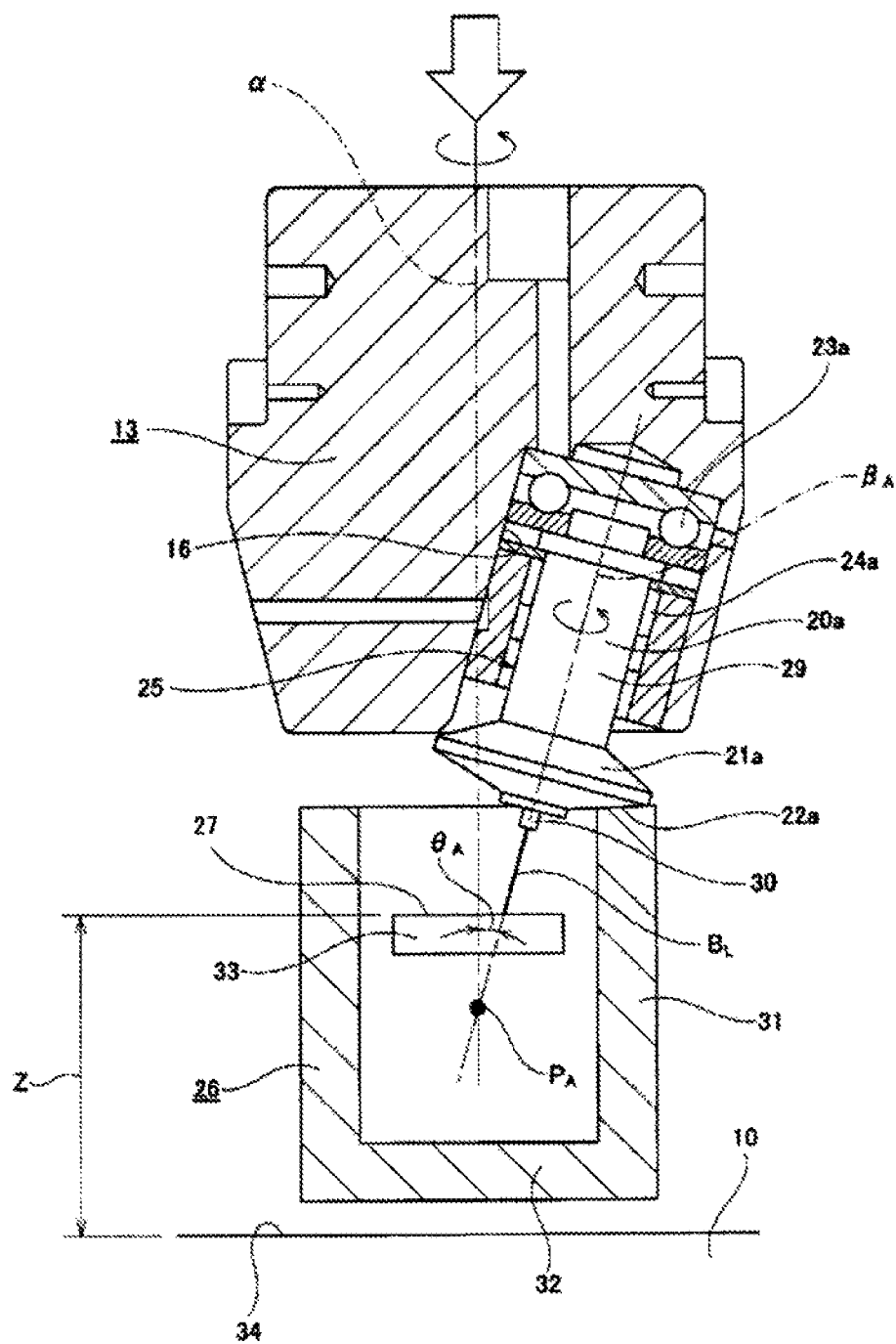
FIG. 4 is a partial sectional view depicting an inspection device of the swing forging apparatus in accordance with the example of the embodiment.

As shown in FIG. 4, the pressing surface 22a of the inspection tool 25 is pressed to the upper end portion of the cylindrical part 31 configuring the receiving stand 26. At this time, the pressing force is generated by the cylinder 18. Thereby, the load, which is substantially the same as the load to be applied to the processing roll 15 upon the processing of the swaging part 9, is applied to the inspection tool 25, so that the respective rolling bearings 23a, 24a are elastically deformed. Thereby, the position of the swing center $P_A$ and the inclination angle $\theta_A$ of the inspection tool 25 are changed to be the same as the position of the swing center P and the inclination angle θ of the processing roll 15 upon the processing of the swaging part 9. At this state, the head 13 is rotatively driven about the central axis α thereof, so that while the inspection tool 25 is revolved (and rotated), the laser beam $B_L$ is emitted from the laser generator 30 and the laser beam $B_L$ is irradiated to the laser irradiation surface 27.

Figure 5A:
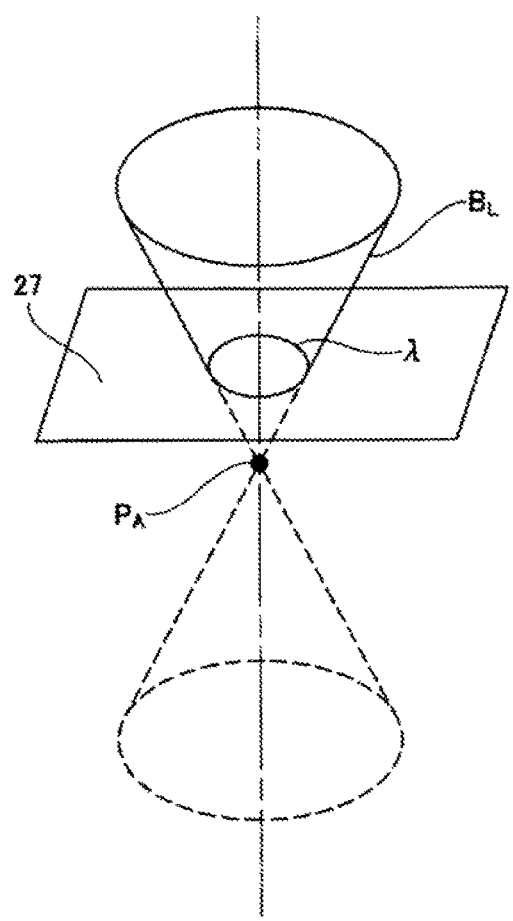
FIGS. 5A and 5B are schematic views for illustrating a principle that a locus of an irradiation position of a laser beam to a laser irradiation surface changes.
Figure 5B:
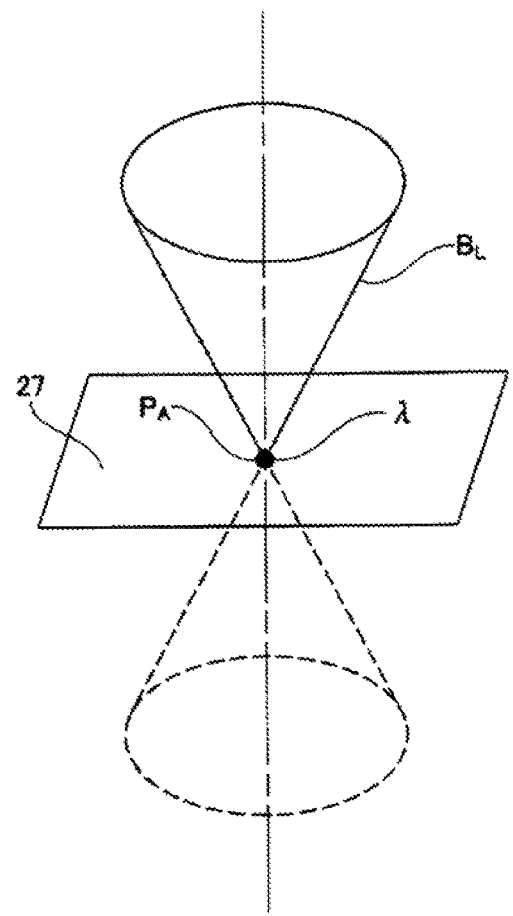
Figure 6A:
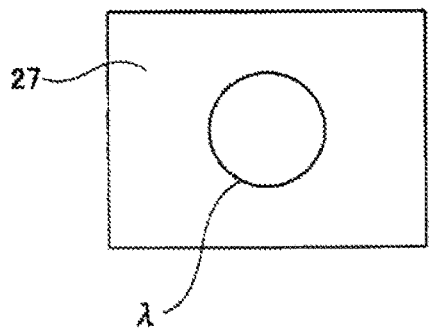
FIGS. 6A and 6B are top views of the locus of the irradiation position of the laser beam to the laser irradiation surface.
Figure 6B:
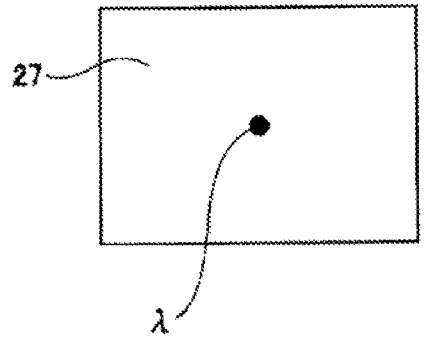
Figure 7A:
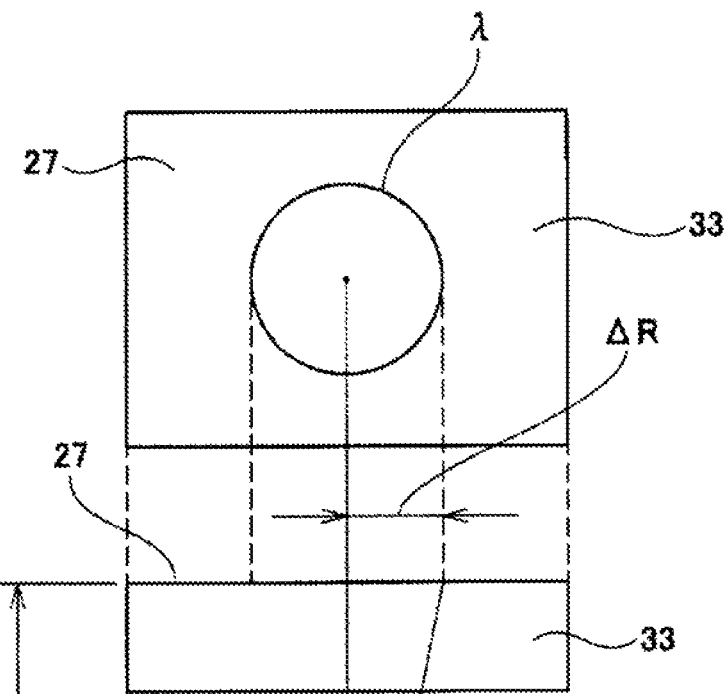
FIGS. 7A and 7B are schematic views for illustrating a principle of obtaining an inclination angle of an inspection tool on the basis of a change in the locus of the irradiation position of the laser beam to the laser irradiation surface.
Figure 7B:
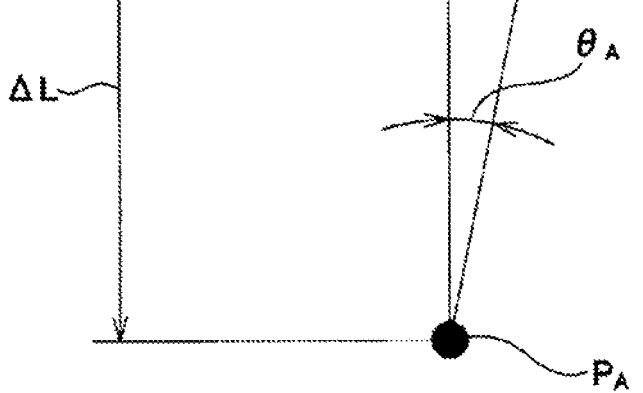

As the inspection tool 25 is revolved as described above, the laser beam $B_L$ forms a conical shape as shown in FIGS. 5A and 5B. For this reason, a locus λ of the laser beam $B_L$ irradiated to the laser irradiation surface 27 forms a circle as shown in FIGS. 6A and 7A or becomes a point as shown in FIGS. 6B and 7B by changing the height Z of the laser irradiation surface 27. A position (height Z) of the point is the position of the swing center $P_A$ of the inspection tool 25.

Therefore, in this example, the computer is configured to obtain the position of the swing center $P_A$ of the inspection tool 25, which is the height Z at which the locus λ of the irradiation position becomes a point, on the basis of the detection signal of the sensor by changing the height Z of the laser irradiation surface 27 (by changing the relative position between the laser irradiation surface 27 and the inspection tool 25 in the axial direction of the head 13).

In the meantime, when implementing this example, the locus λ may not be a complete point due to component precision and the like even if the height Z of the laser irradiation surface 27 is changed. In this case, the height Z at which a radius of the locus λ is smallest is obtained as the position of the swing center $P_A$.

Also, in this example, the computer is configured to change the height Z of the laser irradiation surface 27 (in any of the upward and downward directions) by ΔL from the position at which the locus λ of the laser beam $B_L$ irradiated to the laser irradiation surface 27 becomes a point. Thereby, for example, as shown in FIGS. 7A and 7B, the locus λ of the laser beam $B_L$ irradiated to the laser irradiation surface 27 becomes a circle having a radius ΔR. The computer is configured to obtain the radius ΔR on the basis of the detection signal of the sensor and to calculate an inclination angle of the inspection tool 25 on the basis of a geometrical relationship $\{\tan\theta_A = \Delta R/\Delta L \rightarrow \theta_A = \tan^{-1}(\Delta R/\Delta L)\}$ shown in FIGS. 7A and 7B. In the meantime, when implementing the present invention, the inclination angle $\theta_A$ may also be calculated by changing the height of the laser irradiation surface 27 by the variation ΔL from the position at which the locus λ becomes a circle and using a variation ΔR of the radius of the locus λ resulting from the change, based on the equation $\{\theta_A = \tan^{-1}(\Delta R/\Delta L)\}$.

Meanwhile, in this example, when performing the inspection as described above, the inspection tool 25 is supported to the head 13 at the state where the processing roll 15 is not supported thereto, with the substantially same condition as the processing roll 15. Also, the inspection tool 25 is applied with the load, which is substantially the same as the load to be applied to the processing roll 15 upon the processing of the swaging part 9.

For this reason, under condition that the head 13 is located at the same axial position, the position of the swing center $P_A$ of the inspection tool 25 obtained in the above inspection and the position of the swing center P of the processing roll 15 upon the processing of the swaging part 9 coincide with each other with precision. Therefore, under condition that the head 13 is located at the same axial position, the position of the swing center $P_A$ of the inspection tool 25 obtained as described above can be precisely estimated as the position of the swing center P of the processing roll 15 upon the processing of the swaging part 9.

In the meantime, when the cylinder 18 is driven by a command from the controller of the swing forging apparatus, the position of the swing center P of the processing roll 15 is moved in the axial direction of the head 13. Here, when the position of the swing center P estimated as described above is stored in the controller (as a set with the axial position of the head 13), even though the swing center P is thereafter moved in the axial direction of the head 13, the controller can correctly perceive the position of the swing center P after the movement.

Likewise, the inclination angle $\theta_A$ of the inspection tool 25 calculated as described above precisely coincides with the inclination angle θ of the processing roll 15 upon the processing of the swaging part 9. Therefore, the inclination angle $\theta_A$ of the inspection tool 25 calculated as described above can be precisely estimated as the inclination angle θ of the processing roll 15 upon the processing of the swaging part 9.

In the meantime, the position, which is estimated as described above (which the controller is enabled to recognize), of the swing center P of the processing roll 15 upon the processing of the swaging part 9 can be used for management for appropriately forming the swaging part 9. For example, when forming the swaging part 9 by designing the hub main body 6 on the basis of the position of the swing center P of the processing roll 15, the processing may be ended at a point of time at which the position of the swing center P of the processing roll 15 reaches a predetermined position on the central axis of the hub main body 6. In this case, it is possible to appropriately form the swaging part 9.

Also, the inclination angle θ, which is estimated as described above, of the processing roll 15 upon the processing of the swaging part 9 can be used for management for appropriately forming the swaging part 9. That is, even though the inclination angle θ of the processing roll is different from a designed inclination angle, when a difference therebetween is within a preset acceptable range, it is possible to appropriately form the swaging part 9. In contrast, when the difference is beyond the acceptable range, it is not possible to appropriately form the swaging part 9. Like this, when the difference is beyond the acceptable range, it is possible to appropriately form the swaging part 9 by correcting the difference to be within the acceptable range, for example, by replacing a component of the swing forging apparatus.

Also, in this example, the inspection of the swing forging apparatus as described above may be performed without pressing the pressing surface 22a of the inspection tool 25 to the upper end portion of the cylindrical part 31 (without applying the load to the inspection tool 25). In this case, the position of the swing center $P_A$ and the inclination angle $\theta_A$ of the inspection tool 25 obtained by the computer can be precisely estimated as the position of the swing center P and the inclination angle $\theta$ of the processing roll 15 at a state where the swaging part 9 is not processed.

In the meantime, the position of the swing center P and the inclination angle $\theta$, which are estimated as described above, of the processing roll 15 at a state where the swaging part 9 is not processed can be used to check whether the swing forging apparatus after completion has been manufactured as designed. In addition, when there is a plurality of manufacturing processes (lines) of bearing units including the swing forging apparatus as described above and bearing units having the same model number are manufactured in the processes, it is possible to manufacture the bearing units having the same model number of which a deviation of qualities is sufficiently suppressed by measuring the position of the swing center and the inclination angle of the swing forging apparatus included in each process and adjusting a difference therebetween.

The subject application is based on Japanese Patent Application No. 2016-137710 filed on Jul. 12, 2016, the content of which is incorporated herein by reference.

INDUSTRIAL APPLICABILITY

Figure 1:
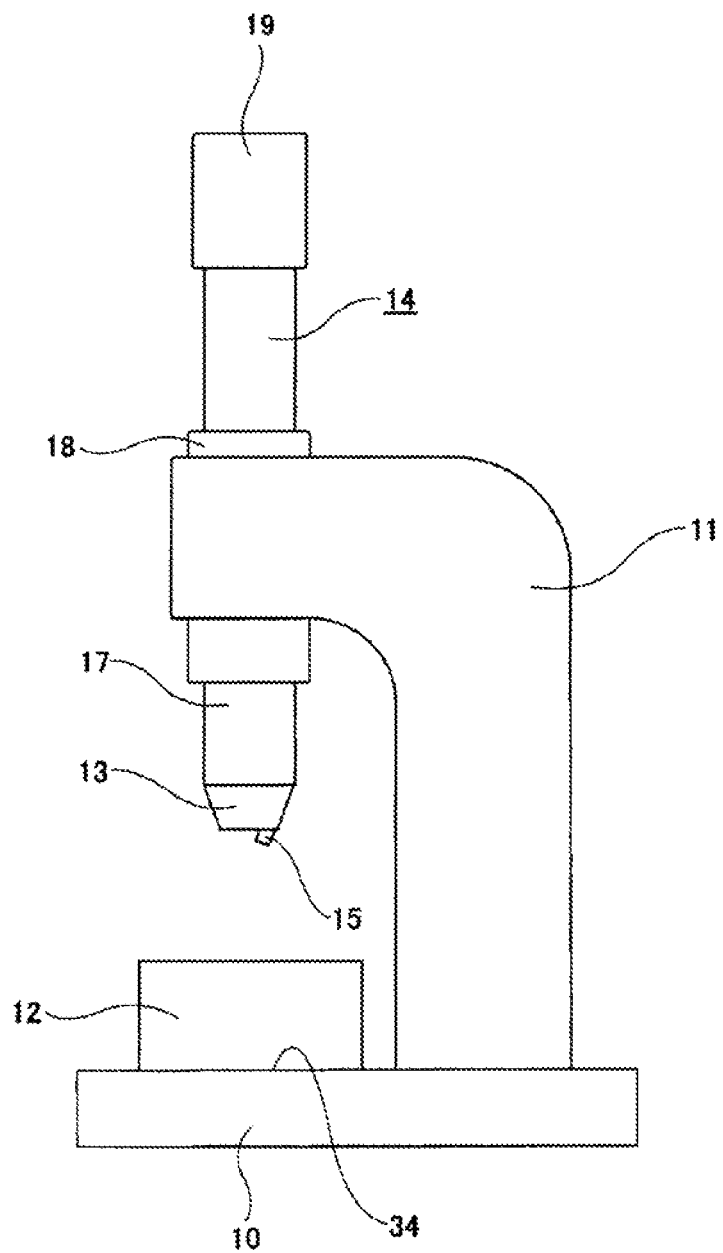
FIG. 1 is a schematic side view depicting a swing forging apparatus, which is an inspection target, in accordance with an example of the embodiment.
Figure 3:
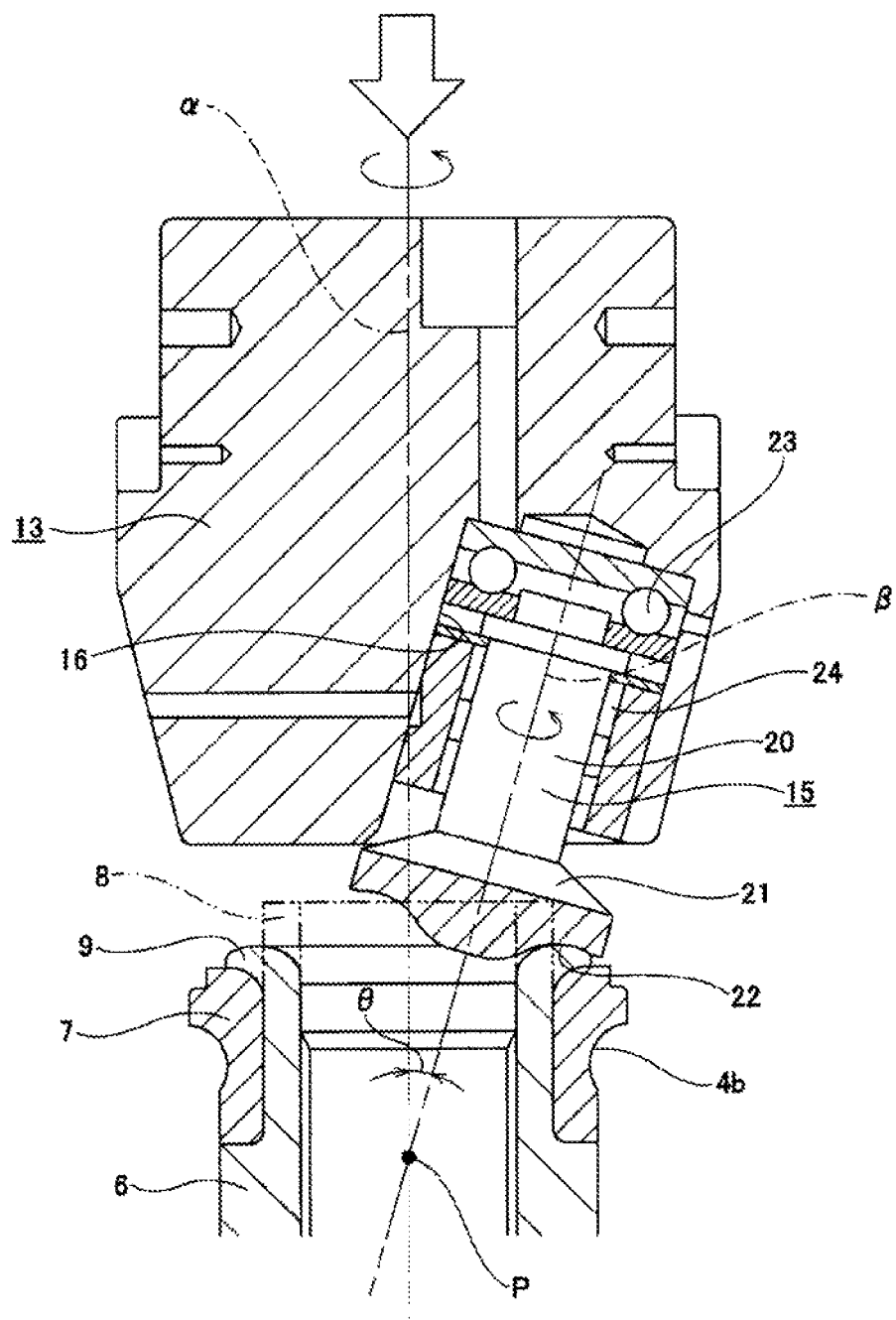
FIG. 3 is a partial sectional view depicting an end state of the processing for forming the swaging part of the rolling bearing unit for wheel support by the swing forging apparatus, which is an inspection target, in accordance with the example of the embodiment.

The present invention is not limited to the swing forging apparatus shown in FIGS. 1 to 3, and may be implemented for a variety of swing forging apparatuses including the swing forging apparatuses disclosed in Patent Documents 1 to 3.

Also, upon the implementation of the present invention, when inspecting the swing forging apparatus while applying a predetermined load to the inspection tool, the predetermined load is not limited to the load, which is to be applied to the processing roll when processing a workpiece by the processing roll, and may be a light load for suppressing the backlash of the inspection tool with respect to the head.

DESCRIPTION OF REFERENCE NUMERALS

1: outer ring, 2: hub, 3a, 3b: outer race, 4a, 4b: inner race, 5: rolling element, 6: hub main body, 7: inner ring, 8: cylindrical part, 9: swaging part, 10: base, 11: support column, 12: holder, 13: head, 14: head driving means, 15: processing roll, 16: holding concave hole, 17: spindle device, 18: cylinder, 19: electric motor, 20, 20a: shaft part, 21, 21a: head part, 22, 22a: pressing surface, 23, 23a: thrust rolling bearing, 24, 24a: radial rolling bearing, 25: inspection tool, 26: receiving stand, 27: laser irradiation surface, 29: inspection roll part, 30: laser generator, 31: cylindrical part, 32: bottom plate part, 33: elevating table, 34: reference surface

The invention claimed is:
1. A method of manufacturing a bearing unit, comprising the following steps:
providing a precursor bearing,
wherein the precursor bearing includes:
an outer ring having double rows of outer races formed on an inner peripheral surface of the outer ring,
a hub having double rows of inner races formed on an outer peripheral surface of the hub, and
a plurality of rolling elements provided between the double rows of outer races and the double rows of inner races,
wherein the hub is configured by coupling a hub main body, which has the inner race directly formed at one axial side of an outer peripheral surface of the hub main body, to an inner ring, which has the inner race directly formed on at the other axial side of an outer peripheral surface of the inner ring,
wherein the inner ring is externally fitted to the other axial side of the hub main body,
wherein an axial end face of the inner ring is pressed by a swaging part formed by plastically deforming a cylindrical part, which is provided at the other axial end portion of the hub main body, in a radially outward direction,
providing a swing forging apparatus and an inspection device that is used to inspect the swing forging apparatus,
wherein the swing forging apparatus includes:
a head configured to be rotatively driven about a central axis of the head,
a processing roll supported to the head so that the processing roll is rotatable about a central axis of the processing roll at a state where the central axis of the processing roll is inclined relative to the central axis of the head,
wherein an inspection device includes an inspection tool and a laser irradiation surface,
wherein when inspecting the swing forging apparatus, the inspection tool is supported to the head to which the processing roll is not supported, with a substantially same condition as the processing roll, and the inspection tool has a function of emitting a laser beam onto a central axis of the inspection tool,
wherein when inspecting the swing forging apparatus, the laser irradiation surface is arranged so that a relative position of the laser irradiation surface to the head in an axial direction of the head can be changed and the laser beam can be irradiated to the laser irradiation surface, and
wherein the manufacturing method further comprises:
using the swing forging apparatus by:
pressing the processing roll of the swing forging apparatus to a circumferential portion of the other axial end portion of the cylindrical part at a state where a central axis of the hub main body coincides with the central axis of the head,
at this state, revolving the processing roll about the central axis of the head and rotating the processing roll about the central axis of the processing roll by rotatively driving the head about the central axis of the head, and
forming the swaging part by plastically deforming the cylindrical part of the hub main body in one radial direction.
2. A method of manufacturing a vehicle comprising the method of manufacturing a bearing unit of claim 1.

3. The method of manufacturing a bearing unit according to claim 1, further comprising arranging a sensor to detect an irradiation position of the laser beam to the laser irradiation surface.

4. The method of manufacturing a bearing unit according to claim 3, further comprising inspecting the swing forging apparatus by, at a state where the head is rotatively driven about a central axis of the head and the laser beam emitted from the inspection tool onto the central axis of the inspection tool is irradiated to the laser irradiation surface:

changing a radius of a locus of an irradiation position of the laser beam to the laser irradiation surface by changing a relative position between the head and the laser irradiation surface in the axial direction of the head, and obtaining a position of the locus having a minimum radius at a coordinate system set for the swing forging apparatus on a basis of a detection signal of the sensor when the radius becomes smallest.

5. The method of manufacturing a bearing unit according to claim 4, further comprising, as part of the estimating step, estimating the position of the locus having the minimum radius as a position of a swing center of the processing roll at a state where the processing roll is supported to the head.

6. The method of manufacturing a bearing unit according to claim 3, further comprising inspecting the swing forging apparatus by, at a state where the head is rotatively driven about a central axis of the head and the laser beam emitted from the inspection tool onto the central axis of the inspection tool is irradiated to the laser irradiation surface, and when a locus of an irradiation position of the laser beam to the laser irradiation surface is changed by changing a relative position between the head and the laser irradiation surface in the axial direction of the head:

obtaining a variation $\Delta R$ in a radius of the locus of the irradiation position on a basis of a detection signal of the sensor when the relative position is changed by a variation $\Delta L$, and obtaining an inclination angle of the central axis of the inspection tool relative to the central axis of the head by using the respective variations $\Delta L$ and $\Delta R$.

7. The method of manufacturing a bearing unit according to claim 6, further comprising, as part of the estimating step, estimating the inclination angle of the central axis of the inspection tool relative to the central axis of the head as an inclination angle of the central axis of the processing roll relative to the central axis of the head at a state where the processing roll is supported to the head.

* * * * *